US009308783B2

(12) United States Patent
Yu et al.

(10) Patent No.: US 9,308,783 B2
(45) Date of Patent: Apr. 12, 2016

(54) TIRE PRESSURE MONITORING DEVICE

(71) Applicant: ORANGE ELECTRONIC CO., LTD., Taichung (TW)

(72) Inventors: Hung-Chih Yu, Taichung (TW); Shih-Hsin Chang, Taichung (TW)

(73) Assignee: ORANGE ELECTRONIC CO., LTD, Taichung (TW)

( * ) Notice: Subject to any disclaimer, the term of this patent is extended or adjusted under 35 U.S.C. 154(b) by 72 days.

(21) Appl. No.: 13/788,660

(22) Filed: Mar. 7, 2013

(65) Prior Publication Data

US 2014/0253311 A1 Sep. 11, 2014

(51) Int. Cl.
*B60C 23/00* (2006.01)

(52) U.S. Cl.
CPC .................................... *B60C 23/00* (2013.01)

(58) Field of Classification Search
CPC .... B60C 23/02; B60C 23/04; B60C 23/0401; B60C 23/0408; B60C 23/0416; B60C 23/0433; B60C 23/0462; B60C 23/00
USPC ...................... 340/447, 442; 73/146.4, 146.5
See application file for complete search history.

(56) References Cited

U.S. PATENT DOCUMENTS 6,469,621 B1 * 10/2002 Vredevoogd et al. ......... 340/445
2008/0164846 A1 * 7/2008 DeKeuster et al. .......... 73/146.3
2011/0140876 A1 * 6/2011 Deniau ........................ 340/445

* cited by examiner

*Primary Examiner* — Thomas Mullen
(74) *Attorney, Agent, or Firm* — Muncy, Geissler, Olds & Lowe, P.C.

(57) ABSTRACT

The tire pressure monitoring device has a storage module, a receiver module and a control module. The tire pressure monitoring device retrieves a protocol by external indication or internal discrimination. The external indication is that the control module retrieves a protocol from the storage module according to an external signal, and then the control module compares the retrieved protocol with a protocol of a tire pressure signal received by the receiver module. If a comparison of the protocols matches, the tire pressure monitoring device decodes the tire pressure signal. The internal discrimination is that the control module compares different protocols stored in the storage module with a protocol of the tire pressure signal. If a comparison of the protocols matches, the tire pressure monitoring device decodes the tire pressure signal.

12 Claims, 3 Drawing Sheets

TIRE PRESSURE MONITORING DEVICE

BACKGROUND OF THE INVENTION

1. Field of the Invention

The present invention relates to a tire pressure monitoring device and more particularly to a tire pressure monitoring device capable of receiving tire pressure signals with different protocols.

2. Description of the Related Art

A conventional tire pressure monitoring device has a tire pressure sensor mounted on each tire of a vehicle. After detecting a tire pressure of the tire, each tire sensor transmits a detection result to a tire condition receiver of the vehicle with a wireless signal. The tire condition receiver receives the wireless signal to determine whether each of the tires is in a normal condition. If any one of the tire sensors detects an abnormal condition, the tire condition receiver generates an audio alarm or a visual alarm to inform a driver of the vehicle that the tire pressure is abnormal.

However, each tire pressure sensor and the tire condition receiver of the conventional tire pressure monitoring device have to use the same protocol to execute a signal encoding, a signal transmission, and a signal decoding. If any of the tire pressure sensors or the tire condition receiver breaks down, a repairman has to replace the broken tire pressure sensor or the broken tire condition receiver with a new one of the same type or the same protocol. Hence, manufacturers or suppliers have to prepare different types of tire pressure sensors or tire condition receivers using different protocols, and hence production and inventory costs are both high. If the broken tire pressure sensor or the broken tire condition receiver is out of stock or out of production, the repairman has to replace the whole tire pressure monitoring device with a new one.

Therefore, a conventional tire pressure monitor mounted on a tire of a vehicle has a sensor, a storage device and a transmitter. The transmitter is electrically connected respectively with the sensor and the storage device. The sensor detects a tire pressure of the tire. The storage device stores codes that include at least one data format. The transmitter of the tire pressure monitor transforms a tire pressure information of the sensor and the code stored in the storage device into a wireless signal and transmits the wireless signal to an external device.

Said disclosed tire pressure monitor analyzes and obtains a protocol of the conventional tire pressure sensor, and then the protocol is written to a new tire pressure sensor through a professional appliance or a computer equipment, that is, an original protocol of the new tire pressure sensor is replaced by the protocol of the conventional tire pressure sensor to correspond to the conventional external device such as an electronic control unit of the vehicle.

When writing a protocol to a new tire pressure sensor, the repairman has to conduct the setting process several times depending on the number of the tires the vehicle has. For a normal four-wheel vehicle, the repairman has to conduct the setting process four times. Hence, a sequence of mounting a new tire pressure sensor consumes a lot of time.

When writing a protocol to a new tire pressure sensor, IDs of each tire pressure sensor are usually set and stored at the same time. The repairman has to respectively assign different IDs to each new tire pressure sensor. If the writing of the protocol and the IDs takes place prior to the mounting of the new tire pressure sensor, the new tire pressure sensor has to be mounted on a tire at a specific location according to a specific ID; otherwise the tire pressure information cannot be recognized. If the mounting of the new tire pressure sensor takes place prior to the writing of the protocol and the IDs, the repairman has to move around the vehicle in the proximities of each tire for setting the protocols such that the work process is complex and time-consuming, and the writing of the protocol and the IDs could be interfered with and shielded by a metal wheel disk of the tire, thereby causing operating problems such as a write failure.

In conclusion, the conventional tire pressure monitor requires replacing the protocol of the new tire pressure sensor with the protocol of an old tire pressure sensor and has problems such as the complex and time-consuming process and the write failure caused by the metal wheel disk.

Other objectives, advantages and novel features of the invention will become more apparent from the following detailed description when taken in conjunction with the accompanying drawings.

SUMMARY OF THE INVENTION

The main objective of the invention is to provide a tire pressure monitoring device to overcome the above-mentioned problems.

The tire pressure monitoring device of the present invention comprises a receiver module, a signal receiver module, a storage module, and a control module. The receiver module receives a tire pressure signal from at least one tire pressure sensor. The signal receiver module receives an external signal from an external control device. The storage module is rewritable and at least one protocol is written in the storage module according to the external signal. The control module is connected with the storage module, the receiver module and the signal receiver module to maintain a signal connection, and retrieves one of the at least one protocol by external indication to decode the tire pressure signal received by the receiver module.

Another embodiment of the tire pressure monitoring device in accordance with the present invention comprises a receiver module, a storage module, and a control module. The receiver module receives a tire pressure signal from at least one tire pressure sensor. The storage module is rewritable and stores multiple protocols. The control module is connected with the receiver module and the storage module to maintain a signal connection, and compares the protocols stored in the storage module with the protocol of the tire pressure signal received by the receiver module. If a comparison of the protocols matches, the control module retrieves the matched protocol to decode the tire pressure signal.

In conclusion, the control module of the present invention retrieves a matched protocol of a tire pressure signal received by the receiver module through external indication or internal discrimination such that the present invention is capable of receiving various kinds of protocols for decoding. Therefore, a new tire pressure sensor can be mounted on a vehicle without changing a protocol of the new tire pressure sensor to solve problems such as a complex and time-consuming work process and a write failure.

DETAILED DESCRIPTION OF THE INVENTION

Figure 1:
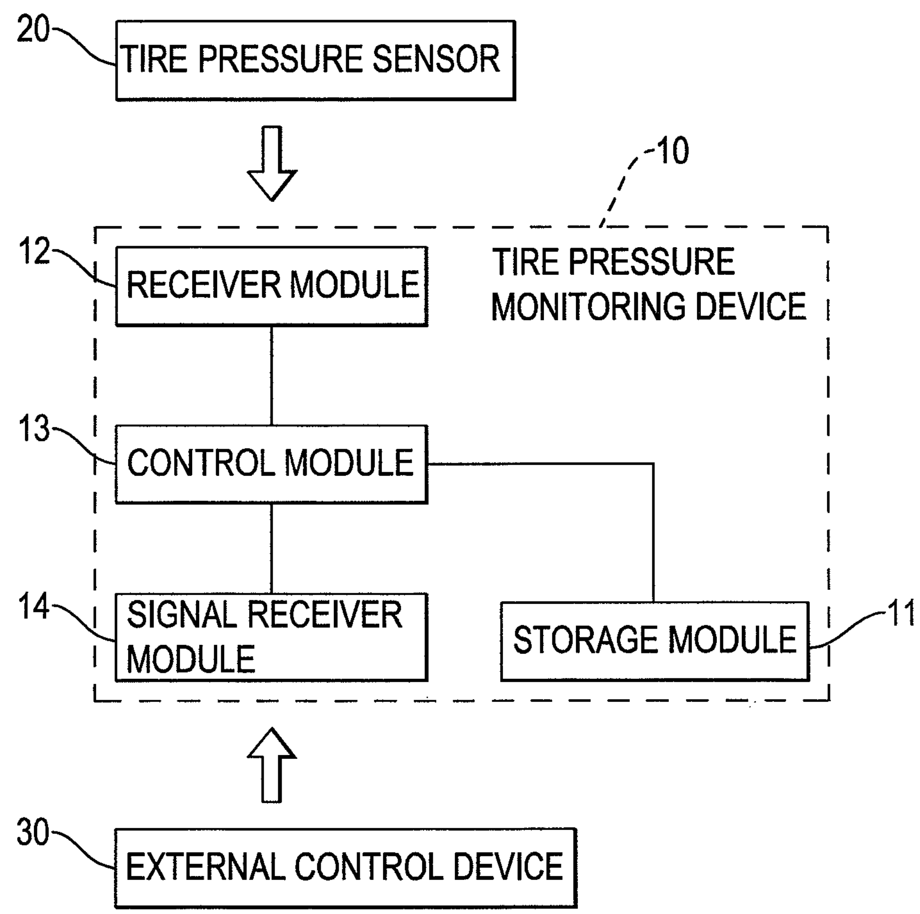
FIG. 1 is a circuit block diagram of a first embodiment of a tire pressure monitoring device in accordance with the present invention.
Figure 2:
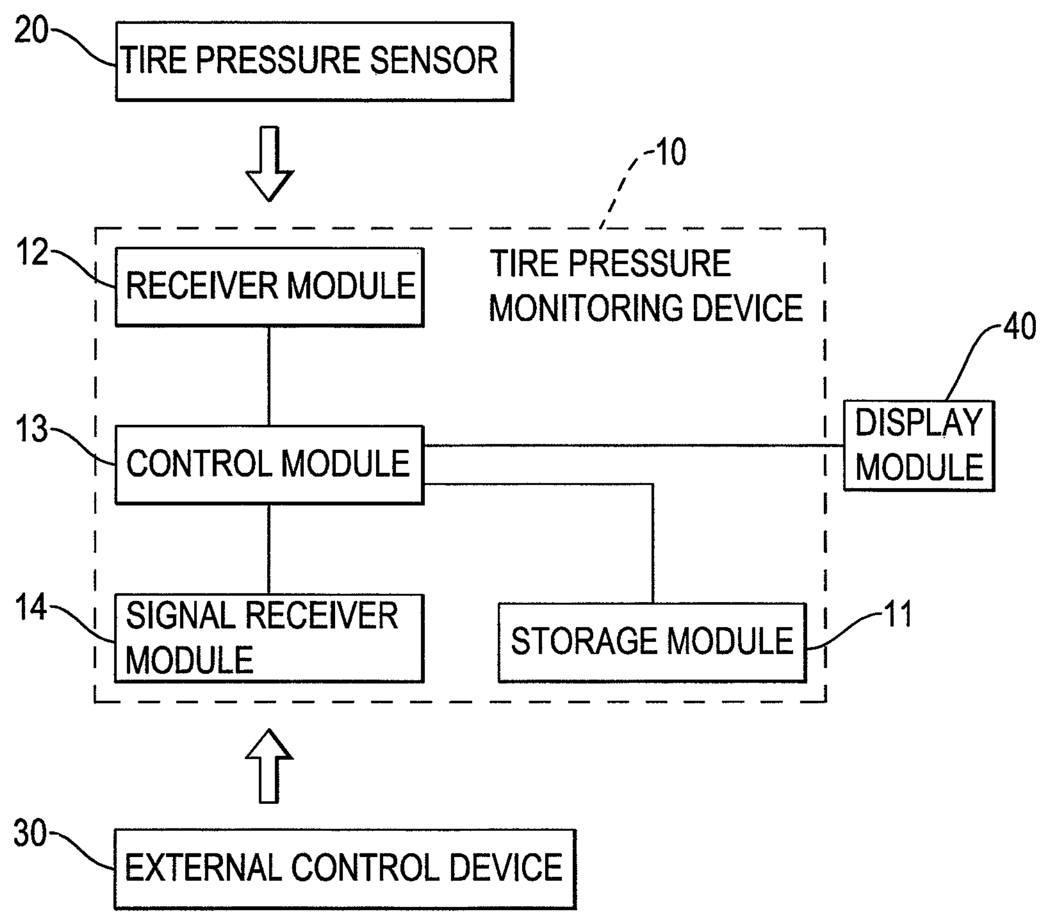
FIG. 2 is a circuit block diagram of a second embodiment of a tire pressure monitoring device in accordance with the present invention.
Figure 3:
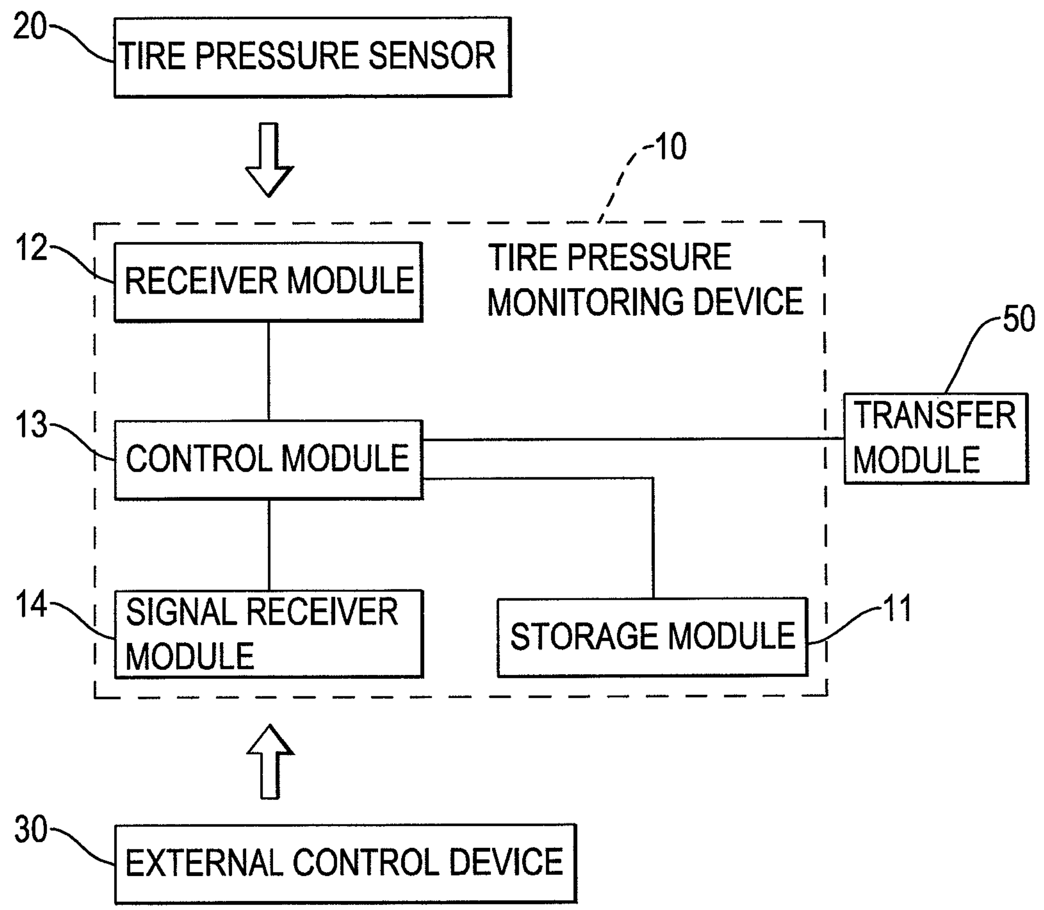
FIG. 3 is a circuit block diagram of a third embodiment of a tire pressure monitoring device in accordance with the present invention.

In a preferred embodiment as shown in FIG. 1, a tire pressure monitoring device 10 receives a tire pressure signal from at least one tire pressure sensor 20. Each one of the at least one tire pressure sensor 20 detects and obtains a tire pressure value of a tire. The tire pressure signal is encoded by a built-in protocol of the at least one tire pressure sensor 20, and then the at least one tire pressure sensor 20 transmits the tire pressure signal to external devices. The tire pressure monitoring device 10 receives and decodes the tire pressure signal with a corresponding protocol.

The tire pressure monitoring device 10 comprises a storage module 11, a receiver module 12, a control module 13 and a signal receiver module 14.

The storage module 11 is rewritable and at least one protocol is written in the storage module 11 according to an external signal, or the storage module 11 pre-stores multiple protocols.

The receiver module 12 receives the tire pressure signal from the at least one tire pressure sensor 20.

The control module 13 is connected with the storage module 11, the receiver module 12, and the signal receiver module 14 to maintain a signal connection.

The tire pressure monitoring device 10 compares a protocol of the tire pressure signal from the at least one tire pressure sensor 20 with the protocol stored in the storage module 11 by internal discrimination or external indication, and then the tire pressure monitoring device 10 decodes the tire pressure signal.

The internal discrimination is that the control module 13 recognizes the tire pressure signal received by the receiver module 12 from the at least one tire pressure sensor 20. The control module 13 retrieves a matched protocol from the protocols stored in the storage module 11 to decode the tire pressure signal. A preferred example of the process of internal discrimination is given as follows.

1. The tire pressure monitoring device 10 pre-stores a first protocol and a second protocol.
2. The tire pressure monitoring device 10 receives a tire pressure signal from the at least one tire pressure sensor 20.
3. The tire pressure monitoring device 10 compares a protocol of the tire pressure signal with the first protocol or the second protocol.
4. If the protocol of the tire pressure signal corresponds to the first protocol or the second protocol, the tire pressure signal is decoded by the first protocol or the second protocol.

The external indication is that the receiver module 12 receives a tire pressure signal from the at least one tire pressure sensor 20 according to an external signal, and then the control module 13 retrieves a protocol stored in the storage module 11 according to the external signal to decode the tire pressure signal. A preferred example of the process of the external indication is given as follows.

1. The tire pressure monitoring device 10 receives an external signal from an external control device that includes at least one protocol and an instruction to write the at least one protocol in the storage module 11.
2. The tire pressure monitoring device 10 receives a tire pressure signal from the at least one tire pressure sensor 20.
3. The tire pressure monitoring device 10 receives an external signal from the external control device that includes an instruction to retrieve one of the at least one protocol to decode the tire pressure signal from the at least one tire pressure sensor 20.

Another preferred example of the process of the external indication is given as follows.

1. The tire pressure monitoring device 10 pre-stores a first protocol and a second protocol.
2. An external signal is provided and includes an instruction for controlling the tire pressure monitoring device 10 to retrieve the first protocol or the second protocol. The tire pressure monitoring device 10 retrieves the first protocol or the second protocol according to the external signal.
3. The tire pressure monitoring device 10 receives a tire pressure signal from the at least one tire pressure sensor 20.
4. The tire pressure monitoring device 10 compares a protocol of the tire pressure signal with the first protocol or the second protocol.
5. If the protocol of the tire pressure signal corresponds to the first protocol or the second protocol, the tire pressure signal is decoded by the first protocol or the second protocol.

Another preferred example of the process of the external indication is given as follows.

1. An external signal is provided and includes a first protocol or a second protocol and a storage instruction corresponding to the first protocol or the second protocol. The tire pressure monitoring device 10 receives the external signal.
2. The tire pressure monitoring device 10 stores the first protocol or the second protocol according to the external signal.
3. The tire pressure monitoring device 10 receives a tire pressure signal from the at least one tire pressure sensor 20.
4. The tire pressure monitoring device 10 compares a protocol of the tire pressure signal with the first protocol or the second protocol.
5. If the protocol of the tire pressure signal corresponds to the first protocol or the second protocol, the tire pressure signal is decoded by the first protocol or the second protocol.

The protocols in accordance with the preferred embodiment are described as follows.

A format of the first protocol:

| Synchronization | Status | Sensor ID | Pressure | Checksum |
|---|---|---|---|---|
| 14 bits | 4 bits | 24 bits | 8 bits | 2 bits |

A format of the second protocol:

| Start | Separating bit | Function | Separating bit | Sensor ID | Pressure | Checksum |
|---|---|---|---|---|---|---|
| 4 bits | 1 bits | 5 bits | 1 bits | 24 bits | 8 bits | 2 bits |

A format of the tire pressure signal received by the tire pressure monitoring device 10:

| Synchronization | Status | Sensor ID | Pressure | Checksum |
|---|---|---|---|---|
| 14 bits | 4 bits | 24 bits | 8 bits | 2 bits |

1. The tire pressure monitoring device 10 pre-stores the first protocol and the second protocol. The tire pressure monitoring device 10 receives the tire pressure signal and compares the first protocol with the tire pressure signal.

2. The tire pressure monitoring device 10 pre-stores the first protocol and the second protocol. An external signal is provided and includes an instruction for controlling the tire pressure monitoring device 10 to retrieve the first protocol. The tire pressure monitoring device 10 retrieves the first protocol according to the external signal to decode the tire pressure signal.

3. An external signal is provided and includes the first protocol and a storage instruction corresponding to the first protocol. The tire pressure monitoring device 10 decodes the tire pressure signal according to the external signal.

The external indication is that the tire pressure monitoring device receives an external signal from an external control device 30 through the signal receiver module 14 connected with the control module 13. The external control device 30 transmits the external signal to the signal receiver module 14 through wired or wireless connection. Wherein the wired connection includes a line connection or a USB port and the wireless connection includes RF, Wi-Fi or Bluetooth. Furthermore, the external control device 30 can be a specific remote control device, even an integrated device combined with the tire pressure monitoring device 10 or an electronic product mounted on a vehicle such as a touch screen or electronic control unit.

In conclusion, means of changing the retrieved protocol of the tire pressure monitoring device 10 includes the following.

1. The control module 13 retrieves a protocol matched with the protocol of the tire pressure signal from multiple protocols stored in the storage module 11.

2. The external control device inputs an external signal to the control module 13 to retrieve a protocol matched with a type of the at least one tire pressure sensor 20.

The second embodiment differs from the first embodiment in that the control module 13 of the second embodiment is connected with a display module 40 displaying the decoded tire pressure values detected by each one of the at least one tire pressure sensor 20. Or, when the tire pressure value detected by each one of the at least one tire pressure sensor 20 does not match a preset value, the display module 40 generates an audio warning or a visual warning.

A difference between the third embodiment and the first embodiment is that the control module 13 of the third embodiment is connected with a transfer module 50 encoding the decoded tire pressure signal. The transfer module 50 can transmit the encoded tire pressure value to other external devices such as an electronic control unit of a vehicle, a tire pressure displayer, and a cell phone as desired. The transfer module 50 can also convert the decoded tire pressure signal into an RF transmission, a Bluetooth transmission or a Wi-Fi transmission as desired and is mounted with a corresponding actuating component.

In conclusion, when the repairman replaces the at least one tire pressure sensor 20 of the present invention by a new tire pressure sensor, the repairman does not have to change a protocol of the new tire pressure sensor and therefore a complex work process is avoided.

What is claimed is:

1. A tire pressure monitoring device capable of receiving tire pressure signals with different protocols, the tire pressure monitoring device comprising:

a receiver module adapted to receive a tire pressure signal from at least one tire pressure sensor respectively mounted on at least one tire of a vehicle;

a signal receiver module adapted to receive a first external signal and a second external signal, wherein the first external signal has at least one protocol and a storage instruction and the second external signal has a specific protocol and a retrieval instruction from an external control device;

a storage module being rewritable, wherein the at least one protocol is written and stored in the storage module according to the first external signal; and a control module connected to the storage module, the receiver module and the signal receiver module, wherein the control module retrieves the specific protocol from the at least one protocol stored in the storage module according to the second external signal to decode the tire pressure signal received by the receiver module.

2. The tire pressure monitoring device as claimed in claim 1, wherein multiple protocols are written and stored in the storage module according to the first external signal.

3. The tire pressure monitoring device as claimed in claim 1, wherein the control module is connected with a display module displaying a tire pressure value by decoding the tire pressure signal from each one of the at least one tire pressure sensor, and when the tire pressure value detected by each one of the at least one tire pressure sensor does not match a preset value, the display module generates a warning.

4. The tire pressure monitoring device as claimed in claim 1, wherein the control module is connected with a transfer module for encoding or converting the decoded tire pressure signal and then transmitting the tire pressure signal to other external devices.

5. A tire pressure monitoring device capable of receiving tire pressure signals with different protocols, the tire pressure monitoring device comprising:

a receiver module adapted to receive a tire pressure signal from at least one tire pressure sensor;

a signal receiver module adapted to receive an external signal having a specific protocol and a retrieval instruction from an external control device;

a storage module being rewritable and pre-storing multiple protocols; and a control module connected with the storage module and the receiver module, retrieving the specific protocol from the multiple protocols in the storage module according to the external signal, comparing a protocol of the tire pressure signal received by the receiver module with the specific protocol and decoding the tire pressure signal with the specific protocol if the protocol of the tire pressure signal and the specific protocol are matched.

6. The tire pressure monitoring device capable of receiving tire pressure signals with different protocols as claimed in claim 5, wherein the control module is connected with a display module displaying the decoded tire pressure signal from each one of the at least one tire pressure sensor, and when a value of the tire pressure signal detected by each one of the at least one tire pressure sensor does not match a preset value, the display module generates an audio warning.

7. The tire pressure monitoring device capable of receiving tire pressure signals with different protocols as claimed in claim 5, wherein the control module is connected with a transfer module encoding the decoded tire pressure signal, and the transfer module encodes the decoded tire pressure signal or converts the decoded tire pressure signal and then transmits the tire pressure signal to other external devices.

8. The tire pressure monitoring device capable of receiving tire pressure signals with different protocols as claimed in claim 5, wherein the control module is connected with a display module displaying the decoded tire pressure signal from each one of the at least one tire pressure sensor, and when a value of the tire pressure signal detected by each one of the at least one tire pressure sensor does not match a preset value, the display module generates a visual warning.

9. A tire pressure monitoring device capable of receiving tire pressure signals with different protocols, the tire pressure monitoring device comprising:

a receiver module adapted to receive a tire pressure signal from at least one tire pressure sensor;

a signal receiver module adapted to receive an external signal having a specific protocol and a storage instruction from an external control device;

a storage module being rewritable, wherein the specific protocol is stored in the storage module according to the external signal; and a control module connected with the storage module and the receiver module, comparing a protocol of the tire pressure signal received by the receiver module with the specific protocol, and then retrieving the specific protocol stored in the storage module to decode the tire pressure signal if the protocol of the tire pressure signal and the specific protocol are matched.

10. The tire pressure monitoring device capable of receiving tire pressure signals with different protocols as claimed in claim 9, wherein the control module is connected with a display module displaying the decoded tire pressure signal from each one of the at least one tire pressure sensor, and when a value of the tire pressure signal detected by each one of the at least one tire pressure sensor does not match a preset value, the display module generates an audio warning.

11. The tire pressure monitoring device capable of receiving tire pressure signals with different protocols as claimed in claim 9, wherein the control module is connected with a transfer module encoding the decoded tire pressure signal, and the transfer module encodes the decoded tire pressure signal or converts the decoded tire pressure signal and then transmits the tire pressure signal to other external devices.

12. The tire pressure monitoring device capable of receiving tire pressure signals with different protocols as claimed in claim 9, wherein the control module is connected with a display module displaying the decoded tire pressure signal from each one of the at least one tire pressure sensor, and when a value of the tire pressure signal detected by each one of the at least one tire pressure sensor does not match a preset value, the display module generates a visual warning.

* * * * *